Oct. 21, 1941.   J. A. VAUGHN   2,259,536
REVOLVING SCRAPER
Filed May 23, 1940   2 Sheets—Sheet 1

INVENTOR:
JESSE A. VAUGHN
ATTORNEYS.

Oct. 21, 1941.                J. A. VAUGHN                2,259,536
                            REVOLVING SCRAPER
                           Filed May 23, 1940                 2 Sheets-Sheet 2

INVENTOR:
JESSE A. VAUGHN
ATTORNEYS.

Patented Oct. 21, 1941

2,259,536

UNITED STATES PATENT OFFICE 2,259,536

REVOLVING SCRAPER

Jesse A. Vaughn, Los Angeles, Calif., assignor to Killefer Manufacturing Corporation, Los Angeles, Calif., a corporation of California Application May 23, 1940, Serial No. 336,823

4 Claims. (Cl. 37—140)

The present invention relates generally to scrapers of the revolving bowl type and has for its principal object the provision of an improved and simplified scraper which is exceptionally light in weight and is particularly adapted for farm use for earth moving operations such as digging ponds, preparing trench silos, leveling fields and maintaining farm roads. More specifically, this invention relates to the provision of a revolving scraper of comparatively light weight design which has the various mechanical features usually found in the more complicated heavy-duty scrapers, together with the various provisions for adjustment which are generally provided in the latter, but in which the number of operating parts and the complications therof are reduced to a minimum, consistent with strength, durability and proper operation.

The features usually provided in a scraper of this class and which are incorporated in the scraper which is the subject of the present invention, are the provision for maintaining the scraper bowl in a predetermined cutting position until the bowl is filled with earth, the provision of means for mechanically tilting the scraper bowl to a non-cutting position for transport after the bowl is filled, the provision of means for manually returning the bowl to a cutting position after it is filled if it is desired to further increase the amount of earth in the scraper bowl, the provision of means for releasing the bowl for rotation to dump the earth which is collected in the bowl, the provision of means for latching the bowl in a spreading position in which the edge of the scraper is used to spread the earth in a thin layer upon the ground, and the provision of adjustments for determining each of the above-mentioned positions of the rotatable bowl.

Figure 1:
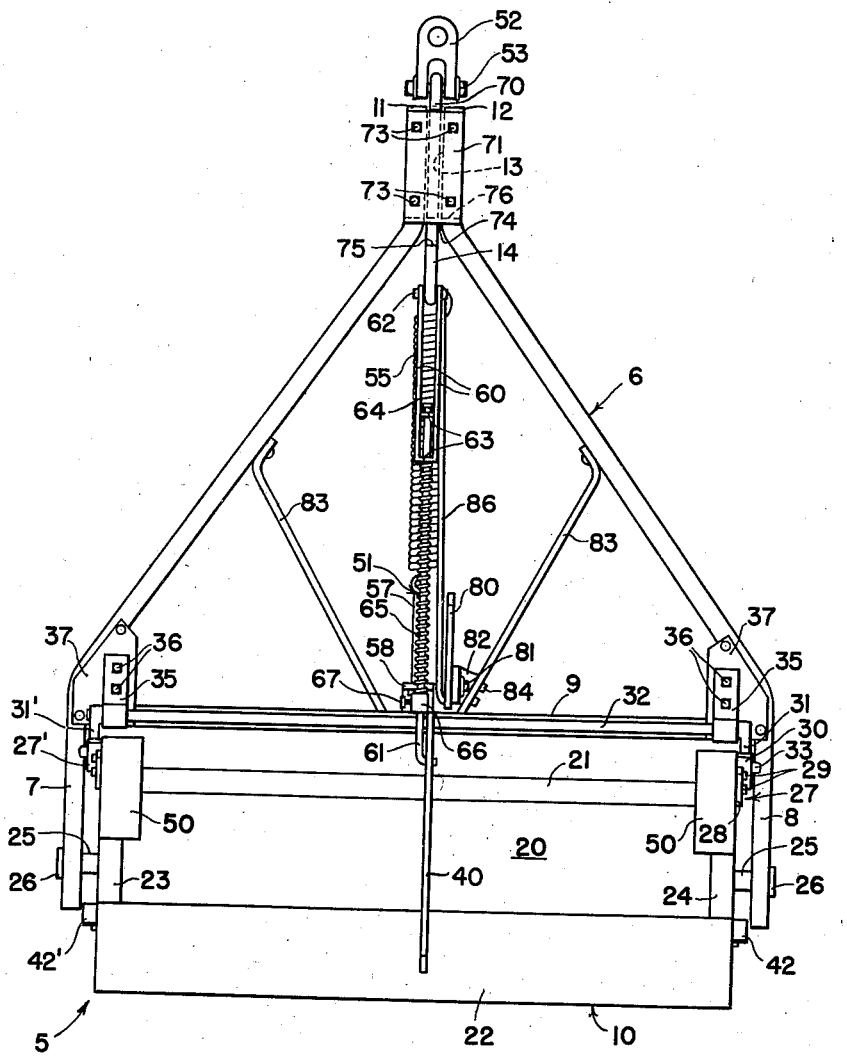
Figure 2:
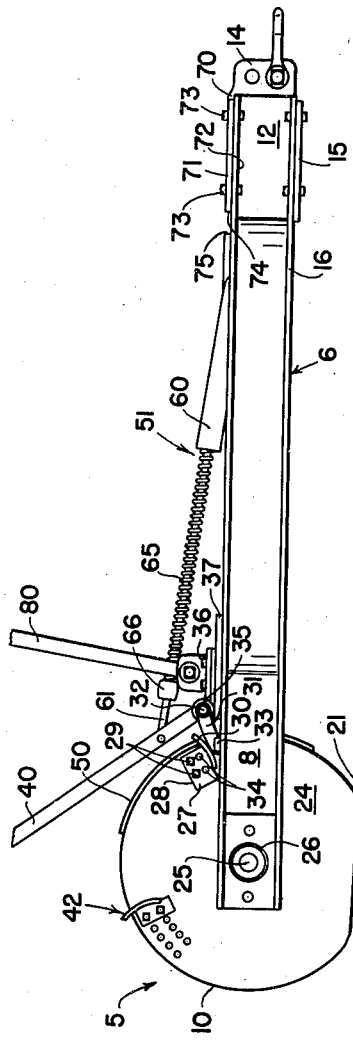
Figure 3:
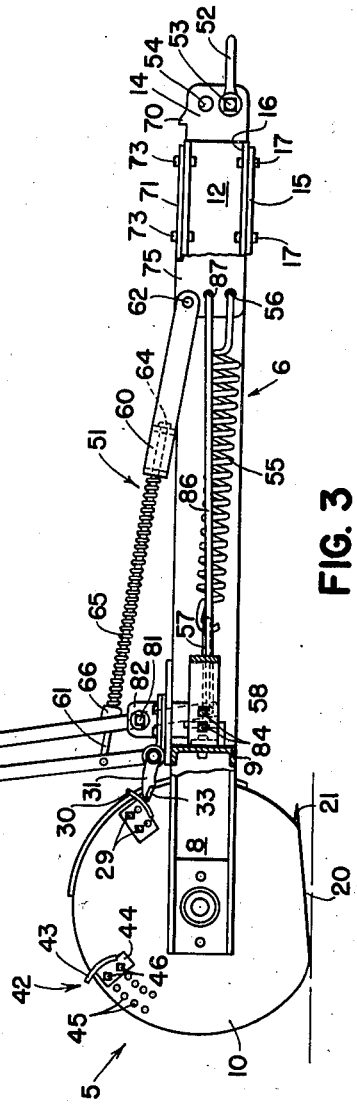

These and other objects and advantages of this invention will be apparent to those skilled in the art after a consideration of the following description in which reference is had to the drawings appended hereto, in which Figure 1 is a plan view of a revolving scraper embodying the principles of the present invention;

Figure 2 is a side elevation of the scraper showing the bowl in cutting or digging position; and Figure 3 is a side elevation of the scraper showing the bowl in a transport position, with a portion of the draft frame broken away to more clearly show the details of the control mechanism.

Referring now to the drawings, the scraper, indicated in its entirety by reference numeral 5, comprises a draft frame 6 including a pair of laterally spaced draft beams 7, 8, interconnected near their rear ends by means of a transversely extending beam 9, and a rotatable scraper bowl 10 disposed between and journaled on the rear ends of the draft beams 7, 8. The beams 7, 8 converge forwardly from the ends of the transverse beam 9, and the forward ends 11, 12 extend forwardly in parallelism in laterally spaced relation to provide a slot 13 therebetween within which is disposed a hitch member 14 in the form of a vertically disposed plate. The hitch member 14 is slidable longitudinally within the slot 13 and is supported on a lower plate 15 which is bolted to each of the lower flanges 16 of the beams 7, 8 by means of bolts 17.

The bowl 10 is generally cylindrical in shape but has a flat bottom 20 along the forward edge of which is a cutting blade 21. A cylindrical back wall 22 curves upwardly from the rear of the bottom 20 to retain the earth collected by the blade 21 and the bowl is closed at opposite ends by a pair of end walls 23, 24 in the form of solid disks, each of which is provided with a supporting trunnion 25 fixed thereto. The trunnions 25 are journaled within bearings 26 which are supported on the rear ends of the draft beams 7, 8, respectively. When the bowl 10 is drawn forwardly in contact with the ground it tends to revolve in the bearings 26.

The bowl 10 is held in loading position with the bottom 20 sloping upwardly and rearwardly from the cutting edge 21, by means of a stop member 27 having a supporting flange 28 fastened to the end wall 24 of the bowl by means of bolts 29. A stop lug 30 extends laterally from the supporting plate 28 and engages an arm 31 which is rigidly mounted on a transversely disposed rock shaft 32 positioned in front of the bowl 10. The arm 31 extends rearwardly from the rock shaft 32 and is provided with a laterally outwardly extending ear 33 which engages the top of the draft beam 8 to limit the downward swinging movement of the arm 31 and thus preventing the bowl from revolving past the position shown in Figure 2. However, extra apertures 34 are provided in the supporting flange 28 of the stop member 27 so that after the bolts 29 have been removed the stop member may be shifted to a position in which the bolts 29 may be inserted through the apertures 34 and thus setting the bowl at a greater cutting angle relative to the ground.

The rock shaft 32 is journaled in a pair of laterally spaced brackets 35 which are fixed by means of bolts 36 to a pair of gusset plates 37, the latter being disposed at opposite ends of the transverse beam 9 and serve as means for strengthening the draft frame 6. At the opposite end of the rock shaft 32 is fixed a second limit arm 31' which is similar to the above-mentioned arm 31 and likewise engages a stop member 27' which is similar to the above-mentioned stop member 27. Obviously, the two stop members 27, 27' should be adjusted to substantially divide the pressure tending to hold the bowl against rotation as the implement is drawn forwardly.

A lever 40 is fixed to the rock shaft 32 near the center thereof and extends upwardly therefrom. The upper end of the lever 40 is provided with a hole 41 to which a rope or other suitable control means can be connected to enable the operator of the tractor or other draft vehicle ahead of the scraper to rock the rock shaft 32 by pulling forwardly on the lever 40. This causes the arms 31, 31' to be raised against the stop lugs 30 and thereby rocking the bowl rearwardly to lift the cutting edge 21 out of cutting position, whereupon the bowl 10 merely slides along the bottom plate 20, the latter being tilted upwardly and forwardly and thus preventing the cutting edge 21 from digging downwardly into the ground. A further actuation of the lever 40 forwardly causes the rock shaft 32 to swing the arms 31 forwardly and upwardly out of engagement with the stop lugs 30, and thus permitting the bowl to roll forwardly as the implement advances, whereupon the collected earth is dumped upon the ground.

If the lever 40 is held in disengaged position the bowl is free to rotate as long as the lever is held in this position, but when it is desired to resume the digging the lever 40 is released to permit the arms 31, 31' to again engage the stop members 27, 27'.

It is frequently desirable to spread the load of earth after it is dumped and for this purpose a second pair of stop members 42, 42' are provided to engage the arms 31, 31' after the bowl has rotated through a part of a revolution, and the bottom 20 of the bowl is disposed in a generally vertical position at the rear of the bowl 10. In this position the cutting edge of the blade 21 is pointing downwardly and serves as a scraping edge which levels off the pile of earth that has been deposited by the bowl. The stop member 42 comprises a stop lug 43 fixed to a supporting flange 44, which is optionally attachable to the end wall 24 in a number of angularly spaced positions indicated by the rows of apertures 45, adapted to receive the securing bolts 46 in the various positions of adjustment of the stop member 42. By shifting the latter in this manner the position of the blade 21 is shifted vertically to govern the depth to which the earth is spread. During the spreading operation the bowl 10 slides upon a pair of arcuate shoes 50 fixed to the edges of the end walls 23, 24, respectively, and these shoes 50 also serve as runners when the bowl is being transported empty from one place to another. The bowl is released from the spreading position as from the loading and carrying positions by pulling forwardly on the lever 40 and thus swinging the arms 31, 31' upwardly away from the stop member 42.

The bowl is swung from cutting position to carrying or transport position when the bowl has accumulated a full load of earth, by means of a link connection 51 which connects the lever 40 with the sliding hitch member 14. The tractor (not shown) applies draft force to the hitch member 14 through a hitch clevis 52 connected by a bolt 53 to one of a plurality of apertures 54 in the forward end of the hitch member and thus tending to slide the latter forwardly between the forward ends 11, 12 of the draft beams 7, 8, respectively. This forward shifting movement of the hitch member is resisted by a helical spring 55, the forward end of which is connected to an aperture 56 in the rear end of the hitch plate 14, and the rear end of which is connected with a rod 57, the latter being anchored to a bracket 58 which is fixed to the cross beam 9 of the draft frame 6. The spring 55 is provided with an initial tension which resists the forward movement of the hitch member 14 when the tractor moves forwardly, so that the resistance of the ground against the cutting edge 21 tends to maintain the bowl in cutting position. As the bowl becomes filled with earth the resistance to the draft force increases whereupon the spring 55 yields and allows the frame 6 to shift rearwardly relative to the hitch member 14. Since the lever 40 is connected by the link 51 to the rear end of the hitch member 14, this relative longitudinal movement results in a forward movement of the lever 40, and if the spring 55 has been properly adjusted with a suitable initial tension, the bowl 10 will be tilted to a non-loading position when it is full of earth and thereby permitting it to be drawn over the ground to the location at which the earth is to be dumped.

The link 51 is made collapsible to permit the lever 40 to be pulled forwardly manually in order to dump the load. The link comprises a pair of telescoping members 60, 61, the forward member 60 comprising a pair of laterally spaced parallel bars connected at their forward ends to the rear end of the hitch plate 14 by means of a bolt 62 and connected together at their rear ends by means of a pair of longitudinally spaced connecting webs 63, the latter being provided with longitudinally aligned apertures (not shown) to slidably receive the rearward telescoping member 61 which is in the form of a rod having a head 64 which bears against the forward web 63 when the link is stressed in tension. The rear end of the rod 61 is bent at right angles thereto and is inserted into a suitable aperture in the lever 40. The telescoping members 60, 61 are maintained in a normally extended position by means of a compression spring 65 which encircles the rod 61 and bears against the rear web 63. A collar 66 is slidably disposed on the rod 61 and is fixed thereto by means of a set screw 67 which provides for adjusting the compression force in the spring 65. The purpose of the spring 65 is to quickly return the stop arms 31, 31' to their normal position with their ears 33 in contact with the draft beams 7, 8, respectively, during the rotation of the scraper bowl 10.

When the scraper is at rest, the initial tension of the spring 55 is resisted by a stop lug 70 which is raised at the forward end of the hitch plate 14 and engages a horizontally disposed gusset plate 71 which interconnects the forward parallel ends 10, 11 of the draft beams 7, 8, and is connected to the upper flanges 72 of the latter by means of bolts 73. The rear edge 74 of the plate 71 serves as a stop for the hitch plate 14 when it is pulled forwardly, the latter being provided with an upwardly extending shoulder 75 adapted to engage the edge 74 of the plate 71, as indicated in Figure 3. Thus the position of the rear edge 74 of the plate 71 determines the angular relation between the bottom 20 of the bowl and the ground when the bowl is in carrying or transport position. In order to provide an extremely simple but effective adjustment of the angular position of the bowl, I have positioned the apertures for the bolts 73 in longitudinally offset relation on the plate 71, so that the rear edge 74 of the plate 71 is spaced farther from the adjacent bolts 73 than the distance between the forward edge of the plate 71 and the adjacent pair of bolts, as indicated in the drawings. Therefore, it is obvious that if the gusset plate 71 is detached from the beams 7, 8 by removing the bolts 73, the plate 71 can then be reversed end for end and reconnected to the beams by replacing the bolts 73, after which the rear edge of the plate 71 is in the position indicated by the broken line 76 in Figure 1, and thus allowing the hitch plate 14 to be pulled farther forward whereupon the bowl is tilted to a greater angle with respect to the ground when in transport position. This has no effect on the position of the bowl in cutting position inasmuch as the latter is determined by the stop member 27 engaging the arms 31. As indicated in Figure 1, the telescoping link 51 is slightly collapsed, but with the plate 71 reversed the link 51 would be practically in fully extended position.

It is frequently desirable to be able to manually return the bowl to cutting position after the latter has been tilted to transport position, in order to collect an extra amount of earth. At other times, it is desirable to manually force the cutting edge against the earth when the bowl is operating in difficult conditions such as in tightly packed clay. For this purpose I have provided a loading lever 80 which is pivotally mounted on a bolt 81 upon a supporting bracket 82 which is fixed to one of a pair of diagonal bracing members 83 by means of bolts 84. The bracing members extend from the converging portions of the draft beams 7, 8 in rearwardly converging relation and are connected at their rear ends to the transverse frame member 9. The lever 80 extends below the transversely disposed pivot bolt 81 and the lower end of the lever is attached to a longitudinally disposed rod 86, the forward end of which is bent at right angles and inserted into an aperture 87 in the rear end of the hitch plate 14. Thus, by pulling forward on the lever 80, the operator can force the hitch plate rearwardly relative to the draft frame, returning the bowl from transport position to cutting position.

From the foregoing description, it will be evident to those skilled in the art, that the scraper disclosed herein has substantially all of the operating features and advantages of conventional scrapers, but the construction of the disclosed device is more simple and less expensive to manufacture.

I claim:

1. A scraper comprising a draft frame, a bowl journaled thereon for rotation about a transverse axis, a hitch member supported on said draft frame and slidable longitudinally thereon, a transverse rock shaft journaled on said draft frame, a pair of arms fixed at opposite ends of said rock shaft adjacent the ends of said bowl, respectively, stops on said bowl adapted to engage said arms, a lever fixed to said rock shaft for rocking the latter to tilt said bowl from loading position to transport position, and adapted upon continued movement of said lever, to move said arms away from said stops and thereby releasing said bowl for rotation, a connecting member between said lever and said slidable hitch member comprising a pair of telescoping elements adapted to collapse when said lever is manually actuated to release said arms from said stops, a loading lever pivoted on said frame, means connecting said lever to said slidable hitch member, and a spring connected to said hitch member and anchored to said frame for yieldably resisting draft force applied to said hitch member.

2. A scraper comprising a rotatable bowl, a pair of draft beams journaled at opposite ends of said bowl, respectively, and converging forwardly therefrom, a hitch member slidably supported between said beams for fore and aft shifting movement relative thereto, a transverse rock shaft journaled on said draft frame, a pair of arms fixed at opposite ends of said rock shaft adjacent the ends of said bowl, respectively, stops on said bowl adapted to engage said arms, a lever fixed to said rock shaft for rocking the latter to tilt said bowl to transport position, and adapted upon continued movement of said lever, to move said arms away from said stops and thereby releasing said bowl for rotation, a connecting member between said lever and said slidable hitch member comprising a pair of telescoping elements adapted to collapse when said lever is manually actuated to release said arms from said stops, and a gusset plate supported generally horizontally on said draft beams for bracing the latter in laterally spaced relation and having detachable means for securing the same to said beams, the rear edge of said plate serving as a stop for said hitch member when draft force is applied thereto, said securing means being disposed in offset relation on said plate, whereby reversing the latter end for end shifts the position of the rear edge relative to said draft frame and thereby changing the position of said hitch member when the latter is against the stop.

3. A scraper comprising a draft frame, a bowl journaled thereon for rotation about a transverse axis, a hitch member supported on said draft frame and slidable longitudinally thereon, a transverse rock shaft journaled on said draft frame, a pair of arms fixed at opposite ends of said rock shaft adjacent the ends of said bowl, respectively, stops on said bowl adapted to engage said arms, a lever fixed to said rock shaft for rocking the latter to tilt said bowl from loading position to transport position, and adapted upon continued movement of said lever, to move said arms away from said stops and thereby releasing said bowl for rotation, a connecting member between said lever and said slidable hitch member comprising a pair of telescoping elements adapted to collapse when said lever is manually actuated to release said arms from said stops, a loading lever pivoted on said frame, means connecting said lever to said slidable hitch member, a spring connected to said hitch member and anchored to said frame for yieldably resisting draft force applied to said hitch member, and means on said arms engageable with said draft frame serving to prevent forward rotation of said bowl past loading position.

4. A scraper comprising a draft frame, a bowl journaled thereon for rotation about a transverse axis, a hitch member supported on said draft frame and slidable longitudinally thereon, a transverse rock shaft journaled on said draft frame, a pair of arms fixed at opposite ends of said rock shaft adjacent the ends of said bowl, respectively, stops on said bowl adapted to engage said arms; a lever fixed to said rock shaft for rocking the latter to tilt said bowl from loading position to transport position, and adapted upon continued movement of said lever, to move said arms away from said stops and thereby releasing said bowl for rotation, a connecting member between said lever and said slidable hitch member, a spring connected to said hitch member and anchored to said frame for yieldably resisting draft force applied to said hitch member, and means on said arm engageable with said draft frame serving to prevent forward rotation of said bowl past loading position.

JESSE A. VAUGHN.